United States Patent
Kaul et al.

[11] Patent Number: 5,879,650
[45] Date of Patent: *Mar. 9, 1999

[54] TANDEM QUENCH

[75] Inventors: David J. Kaul; William L. Sifleet; Gregory T. Gaudet, all of Acton, Mass.; William M. Porteous, Amerillo, Tex.; Allan C. Morgan, Manchester-by-the-Sea, Mass.

[73] Assignee: Cabot Corporation, Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 621,541

[22] Filed: Mar. 25, 1996

Related U.S. Application Data

[63] Continuation of Ser. No. 326,902, Oct. 21, 1994, abandoned, which is a continuation-in-part of Ser. No. 697,750, May 20, 1991, abandoned, which is a continuation of Ser. No. 370,723, Jun. 23, 1989, abandoned, which is a continuation of Ser. No. 334,144, Apr. 6, 1989, abandoned.

[51] Int. Cl.⁶ .................................................. C09C 1/44
[52] U.S. Cl. ........................................ 423/449.1; 423/450
[58] Field of Search .................................. 423/450, 449.1

[56] References Cited

U.S. PATENT DOCUMENTS

| | | | |
|---|---|---|---|
| 2,758,666 | 8/1956 | Prentiss | 422/151 |
| 2,785,964 | 3/1957 | Pollack | 422/151 |
| 2,971,822 | 2/1961 | Williams | 422/151 |
| 3,009,783 | 11/1961 | Sheer et al. | 423/450 |
| 3,081,257 | 3/1963 | Johnson et al. | 423/450 |
| 3,211,532 | 10/1965 | Henderson | 422/151 |
| 3,376,111 | 4/1968 | Stegelman | 23/209.4 |
| 3,401,020 | 9/1968 | Kester et al. | 23/209.4 |
| 3,533,752 | 10/1970 | Henderson . | |
| 3,615,211 | 10/1971 | Lavis | 422/151 |
| 3,642,446 | 2/1972 | Heller et al. | 23/209.4 |
| 3,663,172 | 5/1972 | Foster-Pegg | 23/209.4 |
| 3,734,999 | 5/1973 | Dollinger | 423/450 |
| 3,922,335 | 11/1975 | Jordan et al. . | |
| 4,071,496 | 1/1978 | Kraus et al. | 423/445 |
| 4,246,251 | 1/1981 | Braddock | 423/445 |
| 4,320,090 | 3/1982 | Hunt | 422/150 |
| 4,636,375 | 1/1987 | Rothbuhr et al. | 423/450 |
| 4,751,069 | 6/1988 | Dicate et al. | 423/450 |
| 4,765,964 | 8/1988 | Gravley et al. | 422/156 |
| 4,970,059 | 11/1990 | Schaefer et al. | 423/450 |

FOREIGN PATENT DOCUMENTS

| | | | |
|---|---|---|---|
| 15 92 864 | 8/1973 | Germany . | |
| 15 92 980 B2 | 12/1977 | Germany . | |
| 29 44 855 A1 | 5/1981 | Germany | C09C 1/50 |
| 21 06 912 | 6/1986 | Germany | C09C 1/50 |
| 40-35776 | 7/1964 | Japan . | |
| 54-13233 | 5/1979 | Japan | C09C 1/50 |
| 175 327 A3 | 9/1985 | Japan | C09C 1/50 |
| 60-130755 | 12/1986 | Japan | C08L 21/00 |

OTHER PUBLICATIONS

ASTM Standard from the American Society for Testing and Materials, ASTM Standard D 3849, entitled "Carbon Black—Primary Aggregate Dimension from Electron Microscope Image Analysis", 1989 no month.
Form PTO–892 from USSN No. 326,902, no date.
Form PTO–892 from USSN No. 697,750, no date.
Second Form PTO–892 from USSN No. 697,750, no date.
Form PTO–892 from USSN No. 334,144, no date.
German Office Action corresponding to USSN No. 370,723, Jun. 1991.

*Primary Examiner*—Michael Lewis
*Assistant Examiner*—Stuart L. Hendrickson

[57] ABSTRACT

A method for increasing the aggregate size and structure of carbon blacks produced by a furnace carbon black reactor by lowering the temperature of, but not stopping pyrolysis in, the effluent (the mixture of combustion gases and feedstock in which pyrolysis is occurring), preferably up to about 800 degrees F., at a residence time between about 0.0 second and about 0.002 second downstream from the furthest downstream point of injection of feedstock.

10 Claims, 1 Drawing Sheet

TANDEM QUENCH

This application is a continuation of U.S. Ser. No. 08/326,902 filed Oct. 21, 1994, which is a continuation-in-part of U.S. Ser. No. 07/697,750, entitled "Tandem Quench", filed May 20, 1991, which is a continuation of U.S. Ser. No. 07/370,723, filed Jun. 23, 1989, which is a continuation of U.S. Ser. No. 07/334,144, filed Apr. 6, 1989, all now abandoned.

FIELD OF THE INVENTION

The present invention relates to a method for controlling the aggregate size and structure of carbon blacks.

BACKGROUND

Carbon blacks are generally produced in a furnace-type reactor by pyrolyzing a hydrocarbon feedstock with hot combustion gases to produce combustion products containing particulate carbon black.

In one type of a furnace carbon black reactor, such as shown in U.S. Pat. No. 3,401,020 to Kester et al., or U.S. Pat. No. 2,785,964 to Pollock, hereinafter "Kester" and "Pollock" respectively, a fuel, preferably hydrocarbonaceous, and an oxidant, preferably air, are injected into a first zone and react to form hot combustion gases. A hydrocarbon feedstock in either gaseous, vapor or liquid form is also injected into the first zone whereupon pyrolysis of the hydrocarbon feedstock commences. In this instance, pyrolysis refers to the thermal decomposition of a hydrocarbon. The resulting combustion gas mixture, in which pyrolysis is occurring, then passes into a reaction zone where completion of the carbon black forming reaction occurs.

In another type of a furnace carbon black reactor, a liquid or gaseous fuel is reacted with an oxidant, preferably air, in the first zone to form hot combustion gases. These hot combustion gases pass from the first zone, downstream through the reactor, into a reaction zone and beyond. To produce carbon blacks, a hydrocarbonaceous feedstock is injected at one or more points into the path of the hot combustion gas stream. The hydrocarbonaceous feedstock may be liquid, gas or vapor, and may be the same or different than the fuel utilized to form the combustion gas stream. The first (or combustion) zone and the reaction zone may be divided by a choke or zone of restricted diameter which is smaller in cross section than the combustion zone or the reaction zone. The feedstock may be injected into the path of the hot combustion gases upstream of, downstream of, and/or in the restricted diameter zone. Furnace carbon black reactors of this type are generally described in U.S. Pat. Reissue No. 28,974 and U.S. Pat. No. 3,922,335.

Although two types of furnace carbon black reactors and processes have been described, it should be understood that the present invention can be used in any other furnace carbon black reactor or process in which carbon black is produced by pyrolysis and/or incomplete combustion of hydrocarbons.

In both types of processes and reactors described above, and in other generally known reactors and processes, the hot combustion gases are at a temperature sufficient to effect pyrolysis of the hydrocarbonaceous feedstock injected into the combustion gas stream. In one type of reactor, such as disclosed in Kester, feedstock is injected, at one or more points, into the same zone where combustion gases are being formed. In other type reactors or processes the injection of the feedstock occurs, at one or more points, after the combustion gas stream has been formed. In either type of reactor, since the hot combustion gas stream is continually flowing downstream through the reactor, pyrolysis continually occurs as the mixture of feedstock and combustion gases passes through the reaction zone. The mixture of feedstock and combustion gases in which pyrolysis is occurring is hereinafter referred to, throughout the application, as "the effluent". The residence time of the effluent in the reaction zone of the reactor is sufficient, and under conditions suitable, to allow the formation of carbon blacks. "Residence time" refers to the amount of time which has elapsed since the initial contact between the hot combustion gases and the feedstock. After carbon blacks having the desired properties are formed, the temperature of the effluent is further lowered to stop pyrolysis. This lowering of the temperature of the effluent to stop pyrolysis may be accomplished by any known manner, such as by injecting a quenching fluid, through a quench, into the effluent. As generally known to those of ordinary skill in the art, pyrolysis is stopped when the desired carbon black products have been produced in the reactor. One way of determining when pyrolysis should be stopped is by sampling the effluent and measuring its toluene extract level. Toluene extract level is measured by ASTM D1618-83 "Carbon Black Extractables—Toluene Discoloration". The quench is generally located at the point where the toluene extract level of the effluent reaches an acceptable level for the desired carbon black product being produced in the reactor. After pyrolysis is stopped, the effluent generally passes through a bag filter system to separate and collect the carbon blacks.

Generally a single quench is utilized. Kester, however, discloses the use of two quenches to control certain properties of carbon blacks. Kester relates to controlling the modulus-imparting properties of carbon blacks by heat treatment. This heat treatment is achieved by regulating the water flow rates to two water spray quenches, positioned in series, in the effluent smoke in a carbon black furnace. The modulus of a carbon black relates to the performance of the carbon black in a rubber product. As explained in the article by Schaeffer and Smith, "Effect of Heat Treatment on Reinforcing Properties of Carbon Black" (Industrial and Engineering Chemistry, Vol. 47, No. 6; Jun. 1955, page 1286), hereinafter "Schaeffer", it is generally known that heat treatment will effect the modulus-imparting properties of carbon black. However, as further explained in Schaeffer, the change in the modulus-imparting properties of carbon blacks produced by heat treating results from a change in the surface chemistry of the carbon blacks. Therefore, positioning the quenches as suggested by Kester, in order to subject the combustion gas stream to different temperature conditions, affects the modulus-imparting properties of carbon black apparently by changing the surface chemistry of the carbon blacks rather than by affecting the morphology of the carbon blacks in any discernible way. Moreover, in Kester, both quenches are located in a position in the reaction zone where significant pyrolysis of the feedstock has already occurred. Thus, it would appear that, in Kester's process, by the time the effluent reaches the first quench, the CTAB, tint, DBP and Stokes diameter properties of the carbon blacks have been defined. This supports the conclusion that the change in the modulus-imparting properties in Kester does not result from a change in the morphological properties of the carbon blacks. Still further, Kester does not attach any significance to the position of the first quench, relative to the point of injection of feedstock or residence time, and does not disclose means for selecting the position of the first quench.

U.S. Pat. No. 4,230,670 to Forseth, hereinafter "Forseth", suggests the use of two quenches to stop pyrolysis. The two quenches are located inches apart at the point where a single quench would be located. The purpose of the two quenches is to more completely fill the reaction zone with quenching fluid to more effectively stop pyrolysis. In Forseth however, by the time the effluent reaches the quenches, the CTAB, Tint, DBP and Stokes Diameter properties of the carbon blacks have been defined.

U.S. Pat. No. 4,265,870, to Mills et al., and U.S. Pat. No. 4,316,876, to Mills et al., suggest using a second quench located downstream of the first quench to prevent damage to the filter system. In both patents the first quench completely stops pyrolysis and is located at a position generally known to the art, and by the time the effluent reaches the first quench, the CTAB, Tint, DBP and Stokes Diameter properties of the carbon blacks have been defined. The second quench further reduces the temperature of the combustion gas stream to protect the filter unit.

U.S. Pat. No. 4,358,289, to Austin, hereinafter "Austin", also relates to preventing damage to the filter system by the use of a heat exchanger after the quench. In this patent also, the quench completely stops pyrolysis and is located at a position generally known to the art. In Austin, by the time the effluent reaches the first quench, the CTAB, tint, DBP and Stokes diameter properties of the carbon blacks have been defined.

U.S. Pat. No. 3,615,211 to Lewis, hereinafter "Lewis", relates to a method for improving the uniformity of carbon blacks produced by a reactor, and for extending the life of a reactor. To improve uniformity and extend reactor life, Lewis suggests using a plurality of quenches, located throughout the reaction zone, to maintain a substantially constant temperature in the reaction zone. A certain quantity of quenching fluid is injected at the quench located furthest upstream in the reactor, with a greater amount of quenching fluid injected at each subsequent downstream quench. The quench located furthest downstream stops pyrolysis. By maintaining a constant temperature in the reaction zone the apparatus of Lewis promotes uniformity in the carbon blacks produced by the apparatus. However, the plurality of quenches does not control the morphology of carbon blacks produced by the apparatus.

It is generally desirable, however, to be able to control the morphology of carbon blacks such that carbon blacks well suited to a particular end use may be produced. It is also desirable to increase the aggregate size and structure of carbon blacks for a given surface area, since increased aggregate size and structure, as represented by higher DBP, lower tint, and larger Stokes Diameter, makes the carbon blacks better suited for certain end uses.

Accordingly an object of the present invention is to provide a method for controlling the aggregate size and structure of carbon blacks.

An additional object of the present invention is to produce carbon blacks having larger aggregate size and higher structure for a given surface area.

SUMMARY OF THE INVENTION

We have discovered a method which achieves these desirable objects. We have discovered that we can control the morphology of carbon blacks produced in a furnace carbon black process, by lowering the temperature of the effluent without stopping pyrolysis, preferably up to about 800 degrees F., within a specified residence time of up to about 0.002 second downstream from the furthest downstream point of injection of feedstock. The lowering of the temperature may be accomplished by locating a first quench at or within about 4 feet downstream of the furthest downstream point of injection of feedstock and injecting quenching fluid. According to the present invention the production of carbon blacks may be controlled to produce carbon blacks having specific morphological properties such as larger aggregate size and increased structure as shown by higher DBP, lower tint, and increased Stokes diameter for a given surface area (CTAB). We have further discovered that these morphological properties of carbon blacks may be further controlled by varying the amount by which the temperature of the effluent is lowered and/or varying the residence time from the time of the furthest downstream injection of feedstock until the temperature of the effluent is lowered.

In more detail, the present invention relates to a method for controlling the aggregate size and structure of the carbon blacks produced by a furnace carbon black reactor by lowering the temperature of, but not stopping pyrolysis in, the effluent (the mixture of combustion gases and feedstock in which pyrolysis is occurring) at a residence time between about 0.0 second and about 0.002 second, preferably between about 0.0 and about 0.0015 second, downstream from the furthest downstream point of injection of feedstock. The temperature of the effluent is lowered, within the above specified residence time, preferably up to about 800 degrees F. and more preferably between about 50 and about 800 degrees F. The temperature of the effluent may be lowered by a quench, preferably a quench injecting quenching fluid into the effluent, located at point in the reactor whereby the effluent is quenched between about 0.0 and 0.002 second, preferably between about 0.0 and about 0.0015 second, downstream from the furthest downstream point of injection of feedstock. Typically, in order for the effluent to be quenched within the specified residence time, the quench will be located at or within about 4 feet from the furthest downstream point of injection of feedstock. The quench lowers the temperature of the effluent, preferably up to about 800 degrees F., and more preferably between about 50 and about 800 degrees F., but does not stop pyrolysis. According to the present invention, the amount by which the temperature of the effluent is lowered and the residence time at which the lowering of the temperature of the effluent occurs may be varied independently or simultaneously to control the aggregate size and structure of carbon blacks being produced by the reactor. In a reactor using a quench, injecting a quenching fluid, to lower the temperature of the effluent within the specified residence times, this varying of the amount the temperature of the effluent is lowered and the residence time at which the lowering of the temperature of the effluent occurs may be accomplished by varying the quantity of quenching fluid injected from the quench and varying the location of the quench respectively. After carbon blacks with the desired properties have been formed pyrolysis is stopped.

The present invention allows the production of a carbon black product having larger aggregate size and structure for a given surface area than the carbon black products produced by a similar process wherein the temperature of the effluent is not lowered within the specified residence time.

An advantage of the process of the present invention is that the aggregate size and structure of carbon blacks may be controlled.

Another advantage of the process of the present invention is that carbon blacks having larger aggregate size and structure, as shown by higher DBP's, lower tints, and increased Stokes' diameters, for a given surface area, as shown by CTAB, may be produced.

Other advantages of the present invention will become apparent from the following description and claims.

BRIEF DESCRIPTION OF THE DRAWING

The FIGURE is a cross sectional view of an embodiment of the present invention in a carbon black reactor, showing the location of a first and a second quench.

DETAILED DESCRIPTION OF THE INVENTION

Figure 1:
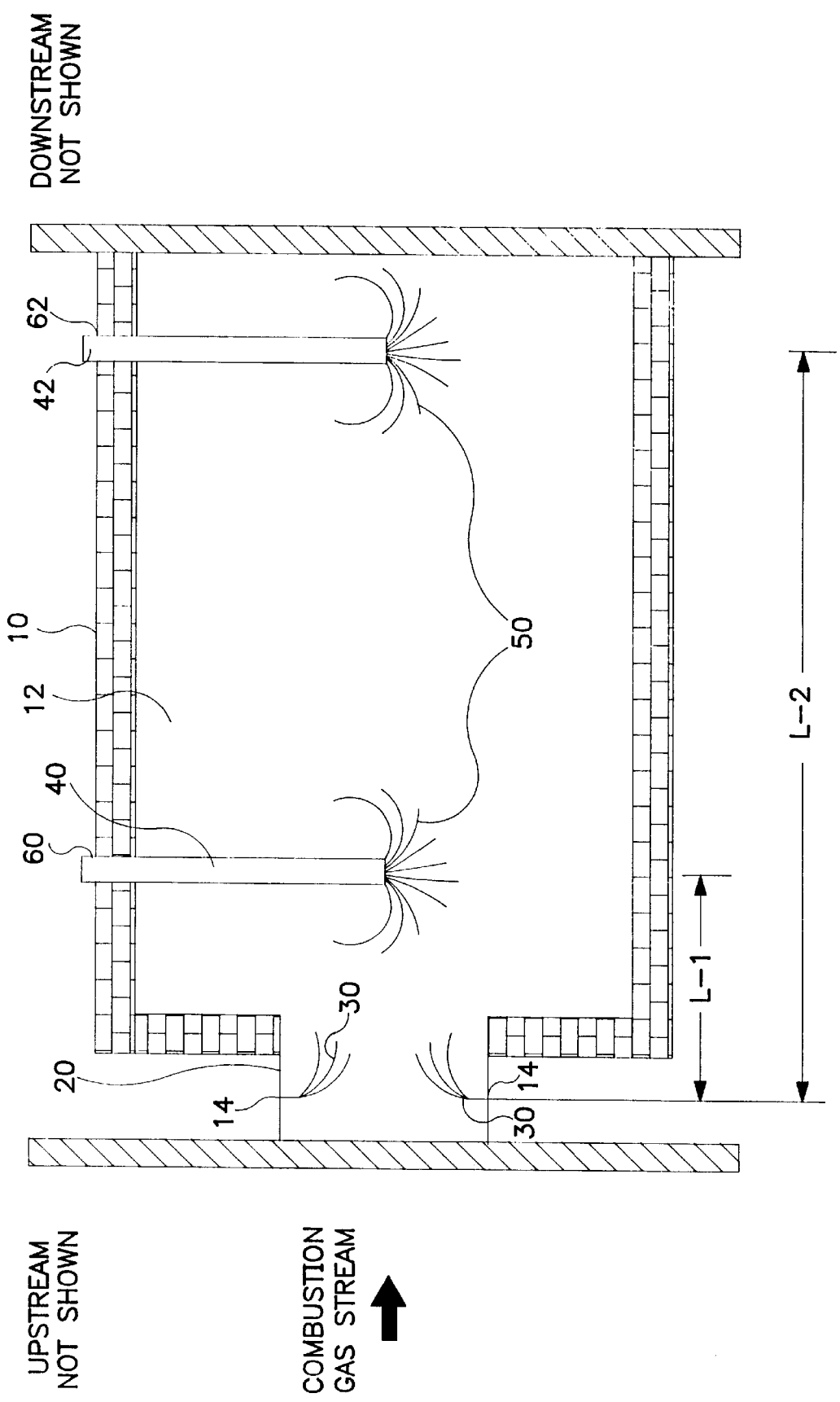

The FIGURE depicts one possible embodiment of the present invention. Although a portion of one type of carbon black reactor is depicted in the FIGURE, as previously explained the present invention can be used in any carbon black furnace reactor in which carbon black is made by pyrolysis and/or incomplete combustion of hydrocarbons. Further, although the following description explains an embodiment of the present invention utilizing a quench, injecting a quenching fluid, to lower the temperature of the effluent, as will be understood by those of ordinary skill in the art, the present invention encompasses any method for lowering the temperature of the effluent, preferably by the amounts specified, within the specified residence times from the point of injection of feedstock nearest the reaction zone. Similarly, although the following description describes using a second quench to stop pyrolysis, as will be understood by those of ordinary skill in the art, the present invention encompasses any method for stopping pyrolysis.

In the FIGURE, a portion of a carbon black reactor 10, having, for example, a reaction zone 12, and a zone of restricted diameter 20, is equipped with a first quench 40, located at point 60, and a second quench 42, located at point 62, for injecting quenching fluid 50. The quenching fluid 50 may be the same or different for each quench. The direction of flow of the hot combustion gas stream through reactor 10, and zones 12 and 20 is shown by the arrow. Quenching fluid 50 can be injected by first quench 40 and second quench 42 counter-currently, or preferably co-currently, to the direction of the combustion gas stream. Point 14, is the furthest downstream point of injection of feedstock 30. As will be understood by those having ordinary skill in the art, 14, the furthest downstream point of injection of feedstock can be varied. The distance from 14, the furthest downstream point of injection of feedstock, to the point of the first quench 60 is represented by L-1 and the distance from the furthest downstream point of injection of feedstock, 14 to the point of the second quench 62 is represented by L-2.

According to the depicted embodiment of the present invention, the first quench 60 is positioned to lower the temperature of the effluent (the mixture of combustion gases and feedstock in which pyrolysis is occurring) no later than 0.002 second, and preferably between 0.0 and 0.0015 second, residence time from the furthest downstream point of injection of feedstock. Typically, in order for the effluent to be quenched within the specified residence time, the first quench will be located at or within about 4 feet from the furthest downstream point of injection of feedstock. Therefore L-1 will be between about 0.0 and about 4 feet. Quenching fluid is injected through the first quench 60 in order to lower the temperature of the effluent, preferably by an amount up to 800 degrees F., more preferably by an amount between about 50 and about 800 degrees F., provided, however, that the quenching fluid injected through first quench 60 will not stop pyrolysis.

Additionally, according to the present invention the residence time from the furthest downstream point of injection of feedstock until the temperature of the effluent (the mixture of combustion gases and feedstock in which pyrolysis is occurring) is initially lowered, and the amount by which the temperature of the effluent is lowered, may be varied independently or simultaneously to control the aggregate size and structure of the carbon blacks produced by the reactor. In the embodiment of the present invention shown in the FIGURE, varying L-1 will vary the residence time from the time of the furthest downstream injection of feedstock to the time at which the temperature of the effluent is lowered. By varying the amount of quenching fluid injected the amount by which the temperature of the effluent is lowered may be varied.

As explained in the preceding paragraph, in the embodiment of the present invention shown in the FIGURE, depending on the aggregate size and structure desired typically L-1 ranges from about 0.0 feet to about 4 feet. Quenching fluid 50 lowers the temperature of the effluent, preferably by an amount up to about 800 degrees F., more preferably by an amount between about 50 and about 800 degrees F., provided, however, that pyrolysis will not be stopped at first quench 60 by the quenching fluid 50.

After carbon blacks with the desired properties have been produced pyrolysis is stopped at point 62 by quench 42. Point 62 is a point at which carbon blacks having the desired properties have been produced by the reactor. As previously explained, point 62 may be determined in any manner known to the art, for selecting the position of a quench which stops pyrolysis. One method for determining the position of the quench which stops pyrolysis is by determining the point at which an acceptable toluene extract level for carbon black products desired from the reaction is achieved. Toluene extract level may be measured by using ASTM Test D1618-83 "Carbon Black Extractables—Toluene Discoloration". L-2 will vary according to the position of point 62.

The effectiveness and advantages of the present invention will be further illustrated by the following example.

EXAMPLE

To demonstrate the effectiveness of the present invention experiments were conducted in a carbon black production process utilizing one or two quenches and varying the residence time from the time of the furthest downstream injection of feedstock until the time the temperature of the effluent was lowered and the amount by which the temperature of the effluent was lowered. This residence time was varied by varying L-1. The process variables for and the results of the carbon black runs in the experiments are summarized in Tables I and II set forth below. In Table I, Set I comprises runs 1, 2, and 3; and Set II comprises runs 4, 5, and 6. The remaining runs 7–16 comprise comparative Set III in Table II.

TABLE I

| Run | Set | Res. Time (sec) | Temp. Before 1st Q °F. | 1st Q ft. | Temp. After 1st Q °F. | 2nd Q ft. | Temp. After 2nd Q °F. | CTAB | Tint | Tol. Disc. | CDBP | $D_{st}$ nm | Fluffy DBP |
|---|---|---|---|---|---|---|---|---|---|---|---|---|---|
| 1 | I | —      | 2620 | —   | 2620 | 4.2  | 1350 | 109.2 | 120.5 | 68 | 109.5 | 98.8  | 186 |
| 2 | I | 0.0007 | 2620 | 1.4 | 2220 | 17.0 | 1350 | 100.7 | 110.6 | 45 | 110.0 | 109.6 | 205 |
| 3 | I | 0.0005 | 2620 | 1.0 | 2220 | 20.0 | 1350 | 94.3  | 102.2 | 73 | 113.4 | 126.9 | 232 |

TABLE I-continued

| Run | Set | Res. Time (sec) | Temp. Before 1st Q °F. | 1st Q ft. | Temp. After 1st Q °F. | 2nd Q ft. | Temp. After 2nd Q °F. | CTAB | Tint | Tol. Disc. | CDBP | $D_{st}$ nm | Fluffy DBP |
|---|---|---|---|---|---|---|---|---|---|---|---|---|---|
| 4 | II | — | 2570 | — | 2570 | 15.0 | 1350 | 91.6 | 114.6 | 77 | 95.2 | 94.1 | 148 |
| 5 | II | 0.0004 | 2570 | 1.0 | 2270 | 34.0 | 1350 | 93.4 | 106.1 | 78 | 106.4 | 101.5 | 213 |
| 6 | II | 0.0004 | 2570 | 1.0 | 2170 | 36.0 | 1350 | 91.4 | 105.0 | 41 | 107.1 | 103.3 | 220 |

SET I:
Preheat = 900° F.; Gas = 7.2 kscfh; Air = 80 kscfh; Air/Gas = 11.11; Primary Combustion = 123%; Combustion Zone Vol. = .85 ft.$^3$; Injection Zone Diameter = 4.2 in.; Injection Zone Length = 12 in.; Combustion Gas Velocity in Injection Zone = 2000 ft./sec.; Oil = 125 gph; Oil Injection Pressure psig; # of oil tips = 4; Oil tip diameter = 0.042 in.; Reaction Zone Diameter = 13.5 in.
The liquid feedstock (oil) had the following composition; H/C Ratio = 91; Hydrogen = 6.89 wt. %, 7.00 wt Carbon = 91.1 wt. %, 90.8 wt. %; Sulfur = 1.1 wt. %; API Gravity 15.6/15 6 C(60 F.) = −5.0; BMCI (Visc-Grav) = 141
SET II:
Preheat = 1100° F.; Gas = 7.5 kscfh; Air = 80 kscfh; Air/Gas = 10.6; Primary Cornbustion = 118% Combustion Zone Vol. =−.85 ft$^3$; Injection Zone Diameter = 4.2 in.; Injection Zone Length = 12 in.; Combustion Gas Velocity in Injection Zone = 2300 ft./sec.; oil = 136 gph; Oil Injection Pressure = 270 psig; # of oil tips = 4; Oil tip diameter = 0.042 in.; Reaction Zone Diameter = 6 in.
The liquid feedstock (oil) had the following composition; H/C Ratio = 1.06; Hydrogen = 7.99 wt %, 7.99 wt. %; Carbon = 89.7 wt. %, 89.5 wt. %; Sulfur = 0.5 wt. %; API Gravity 15.6/15.6 C(60 F.) = 0.5; BMCI (Visc- Grav) = 123
In both Set I and Set II the fluid fuel utilized in the combustion reaction was natural gas having a methane content of 95.44% and a wet heating value of 925 BTU/SCF.

TABLE II

| Run No. | 7 | 8 | 9 | 10 | 11 | 12 | 13 | 14 | 15 | 16 |
|---|---|---|---|---|---|---|---|---|---|---|
| Quench 1 | | | | | | | | | | |
| Length (L-1) ft | — | 15 | 15 | 15 | 5 | 5 | 5 | 0.75 | 0.75 | 0.75 |
| Inwardly (No.xin.) directed sprays | — | — | — | — | — | — | — | 4 × 0.028 | 4 × 0.028 | 4 × 0.028 |
| Center (No.xin.) radial sprays | — | 8 × 0.025 | 8 × 0.035 | 8 × 0.035 | 8 × 0.025 | 8 × 0.035 | 8 × 0.035 | 8 × 0.028 | 8 × 0.028 | 8 × 0.028 |
| Flow gph | — | 60 | 100 | 120 | 60 | 100 | 120 | 60 | 80 | 100 |
| Residence Time Sec. | .0987 | 0.0740 | 0.0740 | 0.0740 | 0.0027 | 0.0027 | 0.0027 | 0.0004 | 0.0004 | 0.0004 |
| Quench 2 | | | | | | | | | | |
| Length (L-1) ft | 19.75 | 19.75 | 19.75 | 19.75 | 19.75 | 19.75 | 19.75 | 19.75 | 19.75 | 19.75 |
| Temp F. | 1350 | 1350 | 1350 | 1350 | 1350 | 1350 | 1350 | 1350 | 1350 | 1350 |
| CTAB m$^2$/gm | 146.8 | 143.8 | 144.0 | 148.3 | 141.5 | 142.3 | 146.6 | 117.8 | 122.9 | 116.4 |
| DBP cc/100 gm | 137.1 | 137.3 | 139.2 | 137.4 | 138.6 | 140.5 | 139.1 | 162.3 | 165.7 | 188.1 |
| CDBP cc/100 gm | 105.3 | 106.7 | 104.2 | 105.1 | 106.4 | 105.9 | 107.8 | 112.5 | 115.8 | 120.9 |
| Tint % | 136.3 | 136.5 | 138.4 | 137.7 | 137.5 | 140.8 | 137.5 | 123.5 | 125.4 | 119.8 |
| Cured at 145° C., 15 min. | | | | | | | | | | |
| Tensile Strength MPa | 22.47 | 20.57 | 27.25 | 20.00 | 21.93 | 22.53 | 21.50 | 23.06 | 22.98 | 21.65 |
| 300% Modulus MPa | 9.66 | 9.25 | 7.97 | 8.43 | 10.27 | 10.91 | 11.15 | 14.29 | 15.25 | 16.29 |
| 300% Modulus psi | 1401. | 1341.6 | 1156.0 | 1222.7 | 1489.6 | 1582.4 | 1617.2 | 2072.6 | 2211.9 | 2362.7 |
| Elongation @ Break % | 1582 | 543 | 669 | 563 | 522 | 520 | 495 | 466 | 441 | 383 |
| Cured at 145° C., 30 min | | | | | | | | | | |
| Tensile Strength MPa | 25.32 | 24.20 | 29.35 | 23.34 | 24.12 | 25.11 | 25.55 | 24.77 | 25.08 | 25.11 |
| 300% Modulus MPa | 11.93 | 11.20 | 11.66 | 10.49 | 12.24 | 14.16 | 12.99 | 16.94 | 18.16 | 19.18 |
| 300% Modulus psi | 1730. | 1624.4 | 1691.2 | 1521.5 | 1775.3 | 2053.8 | 1884.1 | 2457.0 | 2633.9 | 2781.9 |
| Elongation @ Break % | 1567 | 535 | 613 | 561 | 519 | 501 | 518 | 435 | 420 | 397 |
| $D_{st}$ nm | 73 | 71 | 75 | 71 | 74 | 72 | 73 | 87 | 84 | 95 |

For runs 7–16:
Preheat = 1000° F.; Gas = 6.8 kscfh; Air = 80 kscfh; Air/Gas = 11.8; Primary Combustion = 120%; Combustion Zone Vol. = .85 ft$^3$; Injection Zone Diameter = 4.5 in.; Injection Zone Length = 9 in.; Combustion Gas Velocity in Injection Zone = 1834 ft/sec; Oil = 118 gph; Oil injection pressure = 265 psig; # of oil tips = 6; Oil tip diameter = 0.028 in.; Reaction Zone Diameter = 13.5 in.
The liquid feedstock (oil) had the following composition: H/C = 0.94; Hydrogen = 7.2 wt %; Carbon = 91.6 wt %; Sulfur = 0.5 wt %; API Gravity 15.6/15.6 C(60 F.) = −2.7; BMCI (Visc-Grav) = 143
The fluid fuel utilized in the combustion reaction was natural gas.

As will be generally understood by those of ordinary skill in the art, the process variables set forth in the Tables represent variables in the reactor and are determined in the manner generally known. Each set of carbon black runs was made in a carbon black reactor similar to the reactor disclosed in Example 1 of U.S. Pat. No. 3,922,335 with the exceptions as noted in the Tables.

In the Tables, Q refers to Quench. 1st Q ft. refers to L-1, the distance from the furthest downstream point of injection of feedstock to the first quench. Temperature Before 1st Quench (Temp. Bef. 1st Q) refers to the temperature of the effluent before the 1st quench, and Temperature After 1st Quench (Temp. Aft. 1st Q) and Temperature After 2nd Quench (Temp. Aft. 2nd Q) refer to the temperature of the effluent after the 1st quench, and the temperature of the mixture of feedstock and combustion gases after the 2nd quench, respectively. All temperatures relating to quenching are calculated by conventional, well known, thermodynamic techniques. Residence Time (Res. Time), in the Tables, refers to the amount of time after furthest downstream point of injection of feedstock, which elapsed before the temperature of the effluent was initially lowered. In Table I, 2nd Q ft., refers to L-2 and was empirically determined using the toluene extract level. After each run the carbon blacks produced were collected and analyzed to determine CTAB, Tint, $D_{st}$ (median Stokes diameter), CDEP, and in some runs, DBP, Fluffy DBP and Toluene Discoloration. The results for each run are shown in the Tables.

CTAB was determined according to ASTM Test Procedure D3765-85. Tinting strength (Tint) was determined according to ASTM Test Procedure D3265-85a. DBP of fluffy and pelleted blacks was determined according to the procedure set forth in ASTM D2414-86. CDBP was determined according to the procedure set forth in ASTM D 3493-86. Toluene Discoloration was determined according to ASTM Test Procedure D1618-83.

$D_{st}$ (median Stokes diameter) was determined with disc centrifuge photosedimentometry according to the following description. The following procedure is a modification of the procedure described in the Instruction Manual for the Joyce-Loebl Disc Centrifuge, File Ref. DCF4.008, published 1 Feb., 1985, available from Joyce-Loebl Company, (Marquisway, Team Valley, Gateshead, Tyne & Wear, England), the teachings of which are hereby incorporated by reference. The procedure is as follows. 10 mg (milligrams) of a carbon black sample are weighed in a weighing vessel, then added to 50 cc of a solution of 10% absolute ethanol, 90% distilled water which is made 0.05% NONIDET P-40 surfactant (NONIDET P-40 is a registered trademark for a surfactant manufactured and sold by Shell Chemical Co.). The suspension is dispersed by means of ultrasonic energy for 15 minutes using Sonifier Model No. W 385, manufactured and sold by Heat Systems Ultrasonics Inc., Farmingdale, N.Y. Prior to the disc centrifuge run the following data are entered into the computer which records the data from the disc centrifuge:

1. The specific gravity of carbon black, taken as 1.86 g/cc:
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disc speed, which in this instance is 8000 rpm;
7. The data sampling interval, which in this instance is 1 second.

The disc centrifuge is operated at 8000 rpm while the stroboscope is operating. 10 cc of distilled water are injected into the spinning disc as the spin fluid. The turbidity level is set to 0; and 1 cc of the solution of 10% absolute ethanol and 90% distilled water is injected as a buffer liquid. The cut and boost buttons of the disc centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disc and data collection is started immediately. If streaming occurs the run is aborted. The disc is spun for 20 minutes following the injection of the dispersed carbon black in aqueous ethanol solution. Following the 20 minutes of spinning, the disc is stopped, the temperature of the spin fluid is measured, and the average of the temperature of the spin fluid measured at the beginning of the run and the temperature of the spin fluid measured at the end of the run is entered into the computer which records the data from the disc centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density, and rate of sedimentation as the object. The customary units are expressed as nm diameters.

Median Stokes diameter ($D_{st}$ for reporting purposes)—the point on the distribution curve of Stokes diameter where 50% by weight of the sample is either larger or smaller. It therefore represents the median value of the determination.

Samples of the carbon blacks from runs 7 to 16 were each mixed in natural rubber at a loading of 50 phr and cured for either 15 or 30 minutes at 145° C. The resulting rubber compositions were analyzed to determine the 300% modulus tensile strength and modulus according to the procedure set forth in ASTM D412.

As shown in Table I, the present invention allowed production of carbon blacks with increased CDBP's, fluffy DBP's and $D_{st}$'s and decreased tints as compared to the carbon blacks produced by the control carbon black process runs, 1 and 4, utilizing a single quench. This indicates that carbon blacks of the present invention are characterized by increased aggregate size and structure. Further, as shown by the results, the present invention allowed for the production of carbon blacks having increased CDBP's, fluffy DBP's and $D_{st}$'s and decreased tints for a relatively constant CTAB. This indicates that the present invention produced carbon blacks with increased aggregate size and structure for a given CTAB.

As further shown by the results, the present invention produced carbon blacks with increased CDBP's, fluffy DBP's and $D_{st}$'s and decreased tints as compared to the carbon blacks produced by the control carbon black process run 1 at differing residence times at which the temperature of the effluent was initially lowered by the same amount.

Table II is provided to show the analytical properties of carbon blacks that are formed using a single quench arrangement as well as dual quench arrangements wherein the initial quench occurs at varying residence times. As seen in Table II, the analytical properties of the resulting carbon blacks (i.e., CTAB, DBP, CDBP, Tint and Dst) are substantially the same when utilizing a single quench process (run 7) and two dual quench processes wherein the initial quench occurs at residence times of 0.0740 and 0.0027 seconds (runs 8–10 and 11–13). However, when the residence time of the initial quench is reduced to 0.0004 seconds (runs 14–16), the analytical properties of the resulting carbon blacks differ substantially from both the single quench and the previous dual quench runs. In particular, the DBP, CDBP and $D_{st}$ increase significantly. Accordingly, the data show that the process for producing the blacks is directly affected by the time at which the initial quench occurs.

Furthermore, one of ordinary skill in the art would understand from the data in Table II that for a given surface area, the carbon blacks of the present invention (e.g., runs 14–16) have increased aggregate size and structure relative to carbon blacks produced by a single quench process (e.g., run 7) and to carbon blacks produced by a dual quench process where the initial quench occurs at residence times greater than 0.002 seconds (e.g., runs 8–13).

It is also noted from Table II that, in general, the 300% modulus of rubber compositions containing the carbon blacks of Table II changes with residence time. In particular, the process of the present invention as exemplified in runs 14–16 produces carbon blacks that, when incorporated, will yield rubber compositions having a 300% modulus that is substantially higher than that of rubber compositions prepared using carbon blacks produced from processes wherein a single quench is used or the initial quench in a dual quench process has a residence time greater than 0.002 second.

Since the present invention relates to a process for controlling the aggregate size and structure of carbon blacks, numerous variations and modifications may obviously be made in the above described carbon black production runs without departing from the present invention. Accordingly, it should be clearly understood that the forms of the present invention herein described, and shown in the FIGURE, are illustrative only and are not intended to limit the scope of the invention. The present invention includes all modifications falling within the scope of the following claims.

We claim:

1. A process for producing carbon black comprising:

reacting a fuel and an oxidant to create a stream of combustion gases;

passing the stream of combustion gases through a reactor;

injecting feedstock into the stream of combustion gases at one or more points to form an effluent and start pyrolysis of the feedstock in the effluent and the formation of carbon black;

lowering the temperature of the effluent at a first point within a time period of 0.002 second downstream from the furthest downstream point of injection of feedstock, without stopping the pyrolysis of the feedstock in the effluent, wherein said lowering is by an amount sufficient to increase the aggregate size and structure of the carbon black in comparison to the aggregate size and structure of the carbon black produced without the lowering of the temperature at the first point;

further lowering the temperature of the effluent at a second point, downstream of the first point, to stop pyrolysis of the feedstock in the effluent; and separating and collecting the carbon black product, wherein the increase in aggregate size and structure of the carbon black is in comparison to carbon black produced without lowering the temperature of the effluent at the first point.

2. The process of claim 1 wherein the temperature of the effluent is lowered at the first point by an amount up to about 800 degrees F.

3. The process of claim 1 wherein the temperature of the effluent is lowered at the first point by an amount between about 50 and about 800 degrees F.

4. The process of claim 1 wherein the temperature of the effluent is lowered at the first point within a time period of from 0 to 0.0015 second from the furthest downstream point of injection of feedstock.

5. The process of claim 3 wherein the temperature of the effluent is lowered at the first point within a time period of from 0 to 0.0015 second from the furthest downstream point of injection of feedstock.

6. The process of claim 1 wherein the temperature of the effluent is lowered at the first point by injecting a quenching fluid.

7. The process of claim 6 wherein the temperature of the effluent is lowered at the first point within a time period of from 0 to 0.0015 second from the furthest downstream point of injection of feedstock.

8. The process of claim 6 wherein the quenching fluid lowers the temperature of the effluent up to about 800 degrees F.

9. The process of claim 6 wherein the quenching fluid lowers the temperature of the effluent between about 50 and about 800 degrees F.

10. The process of claim 7 wherein the quenching fluid lowers the temperature of the effluent between about 50 and about 800 degrees F.

* * * * *